United States Patent [19]

Morizumi et al.

[11] Patent Number: 4,926,914
[45] Date of Patent: May 22, 1990

[54] VENT CONTROL VALVE ATTACHED TO FUEL FILLER TUBE

[75] Inventors: Mitsuo Morizumi, Atsugi; Kinya Omura, Zama; Eriya Arita, Kawagoe; Katsuji Furuya, Tokyo; Sakae Yasuda, Kawagoe; Masaya Kodera, Zama, all of Japan

[73] Assignees: Nissan Motor Company, Limited; Tsuchiya Mfg. Co., Ltd., both of Japan

[21] Appl. No.: 229,423

[22] Filed: Aug. 8, 1988

[30] Foreign Application Priority Data

Aug. 10, 1987 [JP] Japan .................................. 62-19931

[51] Int. Cl.⁵ .............................................. B65B 31/00
[52] U.S. Cl. ...................................... 141/59; 141/46; 141/301; 220/85 VS; 220/85 VR; 123/519; 55/387; 137/588
[58] Field of Search ............ 220/85 VS, 85 VR, 86 R; 141/59, 44–46, 291, 292, 294, 301, 302; 123/518, 519; 55/387, 168; 137/587, 588, 589

[56] References Cited

U.S. PATENT DOCUMENTS

| | | | |
|---|---|---|---|
| 4,630,749 | 12/1986 | Armstrong et al. | 220/86 R |
| 4,706,708 | 11/1987 | Fornuto et al. | 141/59 X |
| 4,715,509 | 12/1987 | Ito et al. | 220/86 R |
| 4,719,949 | 1/1988 | Mears | 141/301 |
| 4,765,504 | 8/1988 | Sherwood et al. | 220/86 R |
| 4,809,863 | 3/1989 | Woodcock et al. | 220/85 VS X |
| 4,809,865 | 3/1989 | Mori et al. | 220/86 R |

FOREIGN PATENT DOCUMENTS 61-67238  5/1986  Japan .

Primary Examiner—Ernest G. Cusick
Attorney, Agent, or Firm—Leydig, Voit & Mayer

[57] ABSTRACT

A vent control valve for controlling fuel vapor flow from a fuel tank to a vapor storage canister during fuel supply to the fuel tank. The vent control valve is fixedly attached to a fuel filler tube and formed therein with first and second chambers. The first and second chambers are located side by side on an immaginary plane along the fuel filler tube. The first and second chambers are communicated respectively with the fuel tank and the vapor storage canister. A valve mechanism is provided between the first and second chambers and adapted to cause the first and second chambers to communicate with each other so as to allow fuel vapor in the fuel tank to flow into the vapor storage canister, when opened. The valve mechanism is opened when a fuel supply gun is inserted into the fuel filler tube to supply fuel into the fuel tank.

16 Claims, 3 Drawing Sheets

VENT CONTROL VALVE ATTACHED TO FUEL FILLER TUBE

BACKGROUND OF THE INVENTION

1. Field of the Invention

This invention relates generally to improvements in a vent control valve attached to a fuel filler tube of a fuel tank, for example, of an automotive vehicle, and more particularly to such a vent control valve which does not require a larger space therefor.

2. Description of the Prior Art

A fuel filler tube of a fuel tank is usually provided with a vent tube for communicating the inside of the fuel tank with the filler tube near the open end in order to vent fuel vapor in the fuel tank during fuel filling. However, the fuel vapor is unavoidably emitted through the open end of the filler tube to ambient air thereby contaminating air.

In view of this problem, a variety of devices have hitherto proposed and put into practical use. One of them is an arrangement in which fuel vapor in the fuel tank is introduced through an evaporation tube to a vapor storage canister, in which the fuel vapor is purged with purge air to be supplied to an intake system of an engine. Another is an arrangement in which the open end of the filler tube is sealed upon inserting a fuel supply gun or nozzle thereinto to prevent fuel vapor from emission to the outside of the fuel tank during fuel filling without any trouble. A concrete example of such devices will be discussed with reference to FIG. 5 as disclosed in Japanese Utility Model Provisional Publication No. 61-67238. In the device of FIG. 5, a door 3 is disposed inside a fuel filler tube 1 at a portion near the open end 1a and constructed to pivotally move around a hinge pin 3a to open when the fuel supply gun 2 is inserted into the filler tube 1.

A vent control valve 4 is attached to the filler tube 1 in such a manner that a rod 5 thereof is projectable through the opening 1b into the filler tube 1. The tip end 5a of the rod 5 can be pushed upwardly by the door 3 so as to control passage of fuel vapor from a fuel tank to a vapor storage canister. More specifically, the vent control valve 4 is provided at its inside with a partition wall 10 which defines first and second chambers 8, 9 on the opposite side thereof. The first chamber 8 is supplied with fuel vapor through a check valve 7 from a vent tube 6 connected to the fuel tank. The partition wall 10 is formed with a central opening 10a which is closable with a valve member 11 fixed to the rod 5 at the intermediate section. A diaphragm 12 is provided to insulate the second chamber 9 from the opening 1b and the inside of the filler tube 1 in order to prevent liquid fuel from flowing in from the filler tube 1 to the second chamber 9. A spring 14 is disposed between the partition wall 10 and the spring seat 13 fixedly attached to the diaphragm 12. A tube 15 is connected to the vent control valve 4 to communicate the second chamber 9 with the vapor storage canister.

With this vent control valve 4, when the fuel supply gun 2 is inserted into the filler tube 1 at the portion near the open end 1a, the door 3 is pivotally moved in the direction of an arrow A thereby to push up the tip end 5a of the rod 5. Then, the rod 5 moves upwardly against the bias of the spring 14 moving the valve member 11 in the direction of an arrow B, i.e., from the state indicated by solid lines to the state indicated in phantom. As a result, the first and second chambers 8, 9 are brought into communication with each other. Accordingly, fuel vapor flowing out of the fuel tank T through the vent tube 6 flows through the first and second chambers 8, 9 and introduced into the vapor storage canister as indicated by an arrow C. The fuel vapor is once absorbed in activated charcoal in the canister and then purged with purge air during engine operation to be supplied to the intake system of the engine.

However, difficulties have been encountered in the above-discussed vent control valve 4, in which the vent control valve 4 unavoidably projects radially outwardly as a whole from the fuel filler tube 1 since the first and second chambers 8, 9 are located one upon another generally in the radially outward direction relative to the filler tube 1. Accordingly, in installation of the filler tube 1 to the vehicle, a space for the vent control valve 4 is necessary on the vehicle body side thereby decreasing the freedom in design of the vehicle. Additionally, the thus outwardly projecting vent control valve tends to be damaged by careless or sudden impact from the outside.

SUMMARY OF THE INVENTION

It is an object of the present invention to provide an improved vent control valve which can overcome the problems encountered in conventional vent control valves.

Another object of the present invention is to provide an improved vent control valve which does not project outwardly largely from a fuel filler tube thereby to narrow a space required for the vent control valve, while preventing it from being damaged by impact from the outside.

The vent control valve of the present invention is attached to a fuel filler tube and formed with first and second chambers which are located side by side on a plane along the fuel filler tube. The first chamber is communicated with the inside of a fuel tank, while the second chamber is communicated with a vapor storage canister. A valve mechanism is provided to cause the first and second chambers to communicate with each other to allow the inside of the fuel tank to communicate with the vapor storage canister, when opened. The valve mechanism is adapted to be opened when a fuel supply gun is inserted into the fuel filler tube to supply fuel into the fuel tank.

Thus, when fuel supply to the fuel tank is started by inserting the fuel supply gun into the fuel filler tube, the valve mechanism is opened by the fuel supply gun thereby to allow fuel vapor from the fuel tank to flow through the first and second chambers to the vapor storage canister.

Since the first and second chambers are located side by side on the plane along the fuel filler tube, the vent control valve itself can be set compact and lower in height and therefore does not project largely outwardly. Accordingly, a large space for the vent control valve is not previously required. This broadens freedom in design of an vehicle. Additionally, the vent control valve is prevented from being damaged by impact from the outside, thereby improving safety of an evaporative emission control system.

BRIEF DESCRIPTION OF THE DRAWINGS

In the drawings, like reference numerals designate like elements and parts throughout all the figures, in which.

DETAILED DESCRIPTION OF THE INVENTION

Figure 1:
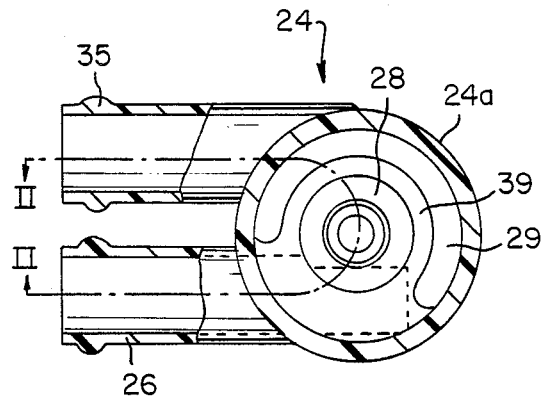
FIG. 1 is a sectional view of a first embodiment of a vent control valve in accordance with the present invention, taken in the direction of arrows substantially along the line I—I of FIG. 2.
Figure 2:
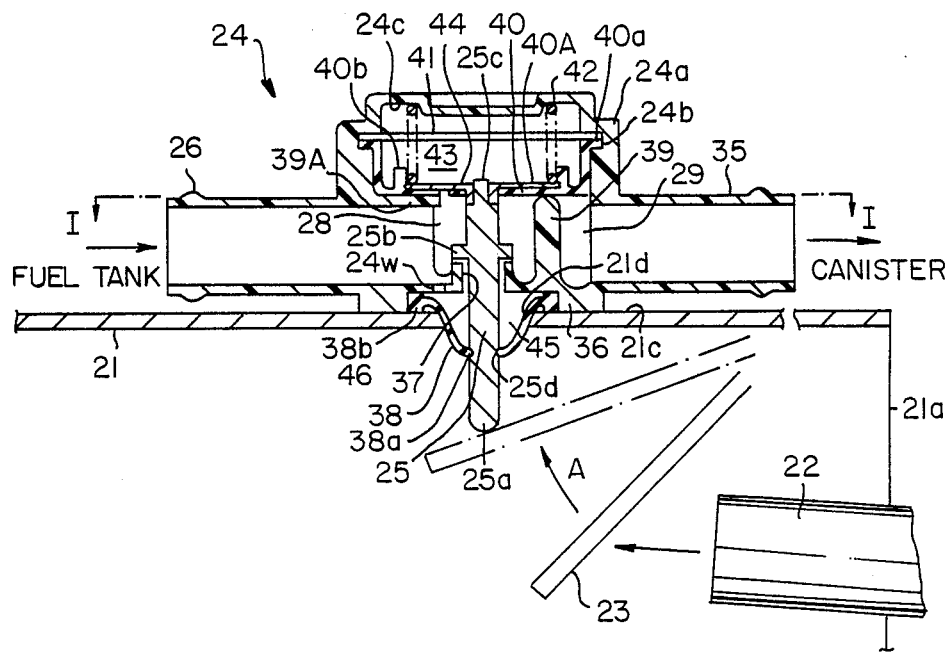
FIG. 2 is a vertical section view of the vent control valve taken in the direction of arrows substantially along the line II—II of FIG. 1.

Referring now to FIGS. 1 and 2, an embodiment of a vent control valve according to the present invention is illustrated by the reference numeral 24. The vent control valve 24 forms part of an evaporative emission control system and comprises a generally cylindrical main body 24a which is fixedly mounted through a mounting section 36 on the Outer peripheral surface 21c of a fuel filler tube 21 at a portion near the open end 21a through which a fuel supply gun or nozzle 22 is inserted into the fuel filler tube 21. The vent control valve main body 24a is provided with a vent tube 26 communicating with the inside of a fuel tank (not shown). The vent control valve main body 24a is formed at the central section of its bottom wall 24w with an inwardly extending cylindrical projection (no numeral) defining thereinside an opening 37. A rod 25 is movably disposed in the opening 37 in such a manner as to be slidable with the inner surface of the cylindrical projection defining the opening 37, in which the axis of the rod 25 is generally perpendicular to the bottom wall 24w. The rod 25 is integrally provided at its intermediate section with a flange 25b which is engageable with the cylindrical projection defining the opening 37 to prevent the rod 25 from getting out of the vent control valve main body 24a. The rod 25 extends downwardly through an opening 21d of the filler tube 21 into the inside of the filler tube 21 so that its lower tip end section 25a is contactable with a door 23.

The door 23 is pivotally connected to the inside wall of the filler tube 21 at the portion near the opening 21a and adapted to open upon being pushed by the fuel supply gun 22. An annular diaphragm type sealing member 38 is disposed to maintain a seal between the rod 25 and the filler tube 21. More specifically, the seal member 38 has an annular thick inner peripheral section 38a fixedly fitted in an annular groove 25d of the rod 25, and an annular thick outer peripheral section 38b fixedly secured to the outer peripheral surface of the filler tube 21. Accordingly, a space 45 is defined between the sealing member 38 and the vent control valve main body 24a. The volume of the space 45 changes with the axial movement of the rod 25.

The vent control valve main body 24a is formed therein with a first or inner chamber 28 in which the upper part of the rod 25 is movably disposed. The first chamber 28 is in communication with the inside of the vent tube 26 and defined by a partition wall 39. The partition wall 39 projects upwardly in FIG. 2 from the bottom wall 24w and is generally C-shaped in cross-section as seen from FIG. 1. A second or outer chamber 29 is formed around the partition wall 39 and generally C-shaped in cross-section as shown in FIG. 1. As shown, the first and second chambers 28, 29 and the partition wall 39 are generally coaxial with the axis of the vent control valve main body 24a. It is to be noted that the first and second chambers 28, 29 are arranged laterally or located side by side above the filler tube 21, thereby preventing them from being located one upon another in the outWard direction of the filler tube 21. In other words, the first and second chambers 28, 29 are formed within a relatively narrow space (not identified) between a first imaginary plane (not identified) containing the outer surface of the bottom wall 24w and a second imaginary plane (not identified) passing through the top end section of the partition wall 39 in this embodiment, in which the first and second imaginary planes are generally parallel with an imaginary plane (not identified) containing the axis of the filler tube 21. Thus, the first and second chambers 28, 29 are located on the opposite sides of the partition wall 39 generally perpendicular to the plane containing the axis of the filler tube 21. The second chamber 29 is communicated through a tube 35 with a vapor storage canister (not shown) containing activated charcoal.

A generally cup-shaped diaphragm member 40 is fixedly secured at its central section to the upper end section 25c of the rod 25 through a rigid plate 40A and located above the first and second chambers 28, 29. The outer peripheral section 40a of the diaphragm member 40 is fitted in an annular groove 24b formed on the inner surface of the main body 24a, together with a reinforcement member 41. A spring 42 is interposed between the main body upper wall 24c and the rigid plate 40A and the diaphragm member 40. The spring 42 is seated inside a cylindrical rib 40b of the diaphragm member 40. The spring 42 biases the diaphragm member 40 downwardly in FIG. 2 so that the diaphragm member 40 is brought into contact with the top end section of the partition wall 39 and a flat wall section 39A. The flat wall section 39A is integral with the partition wall 39 and defines a chamber (no numeral) through which the first chamber 28 communicates with the inside of the vent tube 26. The upper surface of the flat section 39A is planarly aligned with the top of the partition wall 39. Thus, the spring 42 is disposed within a space defined between the main body upper wall 24c and the diaphragm member 40. It will be understood that the communication between the first and second chambers 28, 29 is blocked when the diaphragm member 40 is brought into contact with the partition wall 39 and the flat wall section 39A.

The diaphragm member 40 and the rigid plate 40A are formed with a balance port 44 through which the first chamber 28 and the space 43 are in communication with each other. Additionally, the main body bottom wall 24W is formed with a balance port 46 through which the first chamber 28 and the space 45 are in communication with each other. Otherwise, at least one of the upper end section 25c and the flange 25b of the rod 25 may be formed with a balance port in place of the balance ports 44, 46. In this embodiment, the vent control valve main body 24a is integrally formed with a plurality of outwardly projecting tongue-like sections (not shown) fixedly secured to the filler tube 21 by means of bolts, though not shown.

The manner of operation of the thus arranged vent control valve 24 will be discussed hereinafter.

In a usual condition in which liquid fuel is not supplied to the fuel tank, the diaphragm member 40 is pressed on the top of the partition wall 39 and the flat wall section 39A thereby blocking the communication between the first and second chambers 28, 29. Accordingly, fuel vapor is prevented from flowing from the fuel tank to the vapor storage canister through the vent control valve 24. At this time, even if the pressure within the fuel tank rises, the pressure of the first chamber 28 becomes equal to that of the space 43 by virtue of the balance port 44, so that the diaphragm member 40 cannot move upwardly to separate from the partition wall 39 and the flat wall section 39A.

When liquid fuel is supplied into the fuel tank, the fuel supply gun or nozzle 22 is inserted through the opening 21a of the fuel filler tube 21 thereby to cause the door 23 to pivotally move in the direction of the arrow A to come into an position indicated in phantom in FIG. 2. Then, the door 23 pushes up the end section 25a of the rod 25 so that the diaphragm member 20 fixed to the other end section 25c of the rod 25 moves upwardly, in which the diaphragm member 40 deforms and separates from the partition wall 39 and the flat wall section 39A against the bias of the spring 42. Consequently, the first and second chambers 28, 29 are brought into communication with each other. As a result, fuel vapor (flowing out of the fuel tank during supply of fuel by the fuel supply gun 22 inserted into the filler tube 21) is introduced through the vent tube 26 into the first chamber 28 and then flows into the second chamber 29. Thus, the fuel vapor flows out of the second chamber 29 and introduced through the tube 35 into the fuel storage canister to be absorbed in the activated charcoal in the canister.

When the fuel supply gun 22 is removed from the filler tube 21, the door 23 is restored to its closed position and therefore the diaphragm member 40 is pressed on the partition wall 39 and the flat wall section 39A under the bias of the spring 42, thus blocking the communication between the first and second chambers 28, 29.

The balance port 44 also functions to release gas in the space 43 into the first chamber 28 when the pressure in the space 43 excessively rises. Additionally, the balance port 46 also functions to release gas in the space 45 into the first chamber 28 or into the vent tube 26 when the pressure in the space 45 excessively rises upon deformation of the seal member 38 in case the pressure within the fuel tank rises during fuel supply by the fuel supply gun inserted in the filler tube 21.

It will be understood that, if the rod 25 is broken at the portion having the annular groove 25d, the pushing force of the door 23 does not act on the rod 25 and therefore fuel vapor in the fuel tank is necessarily prevented from flowing out thereafter.

In this embodiment, as shown in FIG. 1, the vent tube 26 and the tube 35 define a plane which is generally parallel to the axis of the fuel filler tube 21. Further, the tubes 26, 35 are parallelly arranged so that a U-shaped passage for fuel vapor is formed through the tubes 26, 35 and the vent control valve main body 24a to make a U-shaped turn of the fuel vapor within the vent control valve 24. This largely increases freedom in layout design of the evaporative emission control system as compared with a conventional arrangement in which a vent tube (26) and a tube (35) are positioned aligned with each other in which fuel vapor flow makes its U-shaped turn at a portion downstream of the tube (35). Additionally, the above-parallel arrangement of the tubes 26, 35 causes the vent control valve itself to function as a kind of liquid-gas separator, thereby decreasing the load of the vapor storage canister.

Figure 3:
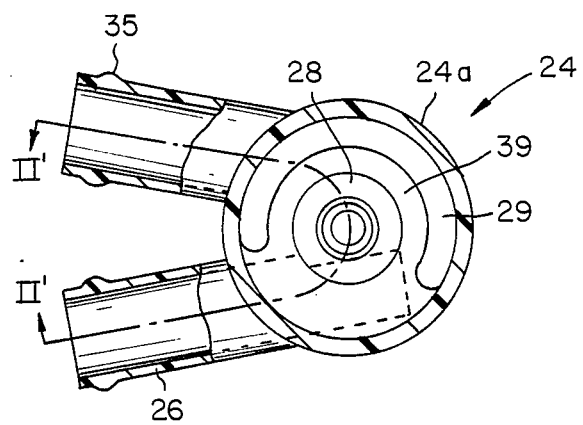
FIG. 3 is a sectional view similar to FIG. 1 but showing a second embodiment of the vent control valve in accordance with the present invention.

FIG. 3 illustrates a second embodiment of the vent control valve 24 according to the present invention similar to the first embodiment with the exception that the vent tube 26 and the tube 35 are arranged generally V-shaped, i.e., the axes of the tubes cross forming an acute angle, so that a V-shaped passage for fuel vapor is formed through the tubes 26, 35 and the vent control valve main body 24a. It will be understood that the vertical sectional view taken in the direction of arrows substantially along the line II'—II' of FIG. 3 is the same as FIG. 2. It will be appreciated that this embodiment functions as same as in the first embodiment.

Figure 4:
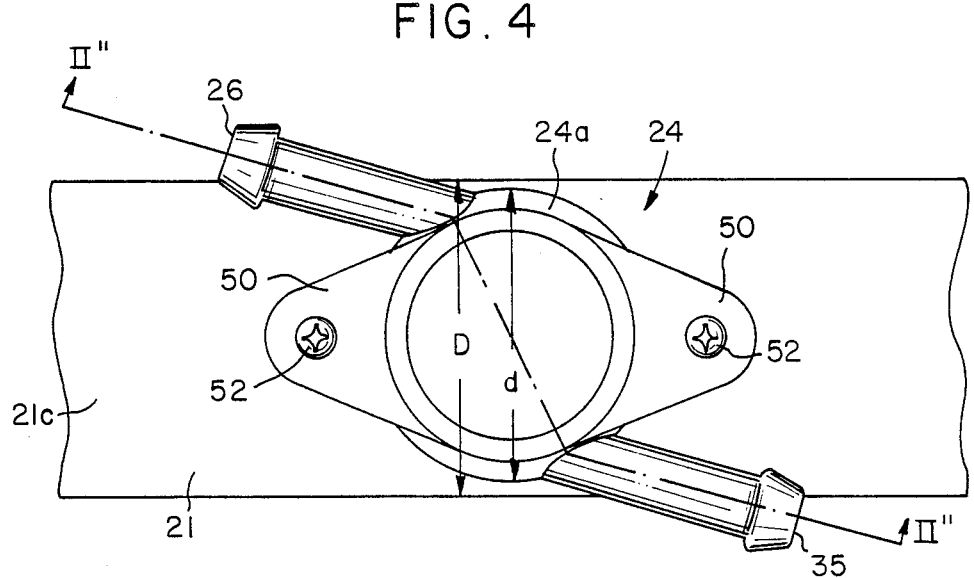
FIG. 4 is a plan view of a third embodiment of the vent control valve in accordance with the present invention.
Figure 5:
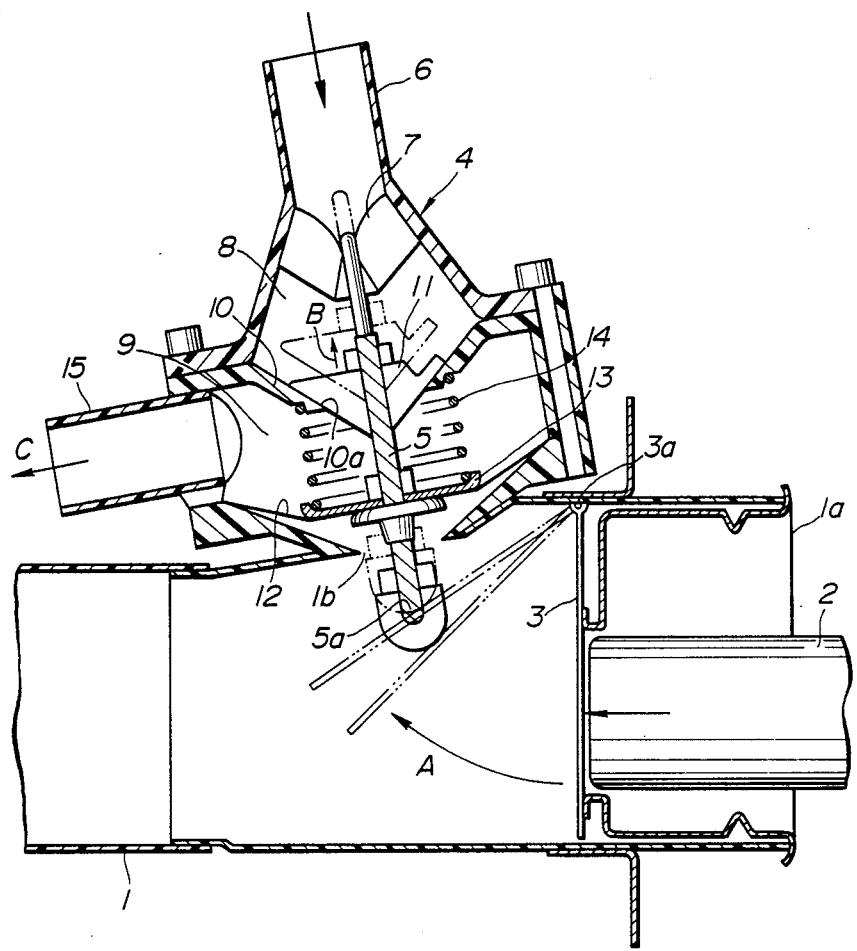
FIG. 5 is a vertical sectional view of a conventional vent control valve.

FIG. 4 illustrates a third embodiment of the vent control valve 24 according to the present invention, similar to the first embodiment with the exception that the vent tube 26 and the tube 35 are arranged extending parallelly and in the opposite directions to each other. In this connection, the vertical sectional view of the vent control valve taken in the direction substantially along the line II"—II" of FIG. 4 is the same as FIG. 2 of the first embodiment. Additionally, in this embodiment, the vent control valve main body 24a has an outer diameter d which is smaller than the outer diameter D of the fuel filler tube 21. The vent control valve main body 24a is integrally formed with a plurality of outwardly projecting tongue-like sections 50 which are fixedly secured to the filler tube 21 by means of bolts 52. It will be appreciated that the vent control valve 24 of this embodiment functions similarly to the first embodiment.

What is claimed is:

1. A vent control system comprising:

a vapor storage canister;

a fuel tank;

a fuel filler tube communicating with the fuel tank and having an axis and a movable door; and a vent control valve attached to the fuel filler tube and including means for defining first and second chambers located side by side on a plane parallel to the fuel filler tube, said first chamber communicating with the fuel tank, said second chamber communicating with the vapor storage canister, and said chambers defining means including a partition wall extending generally perpendicular to the axis of the fuel filler tube wherein said first and second chambers are located on opposite sides of said partition wall and wherein said first and second chambers and said partition wall are generally coaxial with each other and valve means adapted to cause said first and second chambers to communicate with each other so as to allow the fuel tank to communicate with the vapor storage canister, said valve means including a rod extending generally perpendicular to the axis of the fuel filler tube and having first and second end sections and a diaphragm member fixedly secured to the second end section of said rod, said rod and said diaphragm member being movable between a first position wherein said door is spaced from the first end section of said rod and said diaphragm member contacts said partition wall to block communication between said first and second chambers and a second position wherein said door is pushed against said first end section of said rod and said diaphragm member is separated from said partition wall to establish communication between said first and second chambers.

2. A vent control system as claimed in claim 1, wherein said valve means includes a spring for biasing said diaphragm member against said partition wall to block the communication between said first and second chambers.

3. A vent control system as claimed in claim 1 wherein said fuel filler tube includes an end adapted to receive a fuel supply gun and wherein said chambers defining means includes a main body fixedly secured to the fuel filler tube at a portion near the end of the fuel filler tube.

4. A vent control system as claimed in claim 3 further comprising first and second tubes extending from said main body, said first and second tubes communicating respectively with said first and second chambers and further communicating respectively with the fuel tank and the vapor storage canister.

5. A vent control system as claimed in claim 4 wherein said first and second tubes define a plane which extends generally parallel to the axis of the fuel filler tube.

6. A vent control system as claimed in claim 4 wherein said first and second tubes extend parallel to each other and in the same direction.

7. A vent control system as claimed in claim 4 wherein said first and second tubes have axes which cross forming an acute angle.

8. A vent control system as claimed in claim 4 wherein said first and second tubes extend parallel and in opposite directions to each other.

9. A vent control system as claimed in claim 3 wherein said main body has an outer diameter smaller than that of the fuel filler tube.

10. A vent control valve comprising:
means for defining first and second chambers, said chambers defining means including a bottom wall having first and second opposite sides and a partition wall which extends generally perpendicular from the first side of the bottom wall wherein the first and second chambers are located on opposite sides of the partition wall and wherein the first chamber, the second chamber, and the partition wall are generally coaxial with respect to each other and valve means adapted to cause said first and second chambers to communicate with each other, said valve means including a rod having first and second end sections and a diaphragm member fixedly secured to the second end section of said rod, said first end section of said rod extending generally perpendicular beyond second side of the bottom wall, said rod and said diaphragm member being movable between a first position in which said diaphragm member contacts said partition wall to block communication between said first and second chambers and a second position wherein said diaphragm member is separated from said partition wall to establish communication between said first and second chambers.

11. A vent control valve as defined in claim 10 wherein said valve means further includes a spring for biasing said diaphragm member against said partition wall to block communication between said first and second chambers.

12. A vent control valve as claimed in claim 10 wherein said chambers defining means includes a main body and first and second tubes extending from said main body, said first and second tubes communicating respectfully with said first and second chambers.

13. A vent control valve as claimed in claim 12 wherein said first and second tubes define a plane which extends generally parallel to the bottom wall.

14. A vent control valve as claimed in claim 13 wherein the axes of said first and second tubes have axes which cross forming an acute angle.

15. A vent control valve as claimed in claim 14 wherein first and second tubes extend parallel and in opposite directions to each other.

16. A vent control valve as claimed in claim 12 wherein said first and second tubes extend parallel to each other and in the same direction.

* * * * *

UNITED STATES PATENT AND TRADEMARK OFFICE
CERTIFICATE OF CORRECTION

PATENT NO. : 4,926,914

DATED : May 22, 1990

INVENTOR(S) : Morizumi et al

It is certified that error appears in the above-identified patent and that said Letters Patent is hereby corrected as shown below:

On the title page, item [30], should read:
[30] Foreign Application Priority Data Aug. 10, 1987 [JP] Japan ................62-199331

In the Abstract:

Line 6, change "immaginary" to --imaginary--.

In the Claims:

Claim 15, line 2, before "first" insert --said--.

Signed and Sealed this

Third Day of September, 1991

*Attest:*

HARRY F. MANBECK, JR.

*Attesting Officer*     *Commissioner of Patents and Trademarks*